(12) United States Patent
Ishizaki (10) Patent No.: US 8,169,560 B2
(45) Date of Patent: May 1, 2012

(54) LIQUID CRYSTAL DISPLAY AND METHOD OF MANUFACTURING THE SAME

(75) Inventor: Koji Ishizaki, Tokyo (JP)

(73) Assignee: Sony Corporation, Tokyo (JP)

( * ) Notice: Subject to any disclaimer, the term of this patent is extended or adjusted under 35 U.S.C. 154(b) by 327 days.

(21) Appl. No.: 12/528,903

(22) PCT Filed: Aug. 27, 2008

(86) PCT No.: PCT/JP2008/065294
§ 371 (c)(1),
(2), (4) Date: Aug. 27, 2009

(87) PCT Pub. No.: WO2009/028548
PCT Pub. Date: Mar. 5, 2009

(65) Prior Publication Data
US 2010/0118223 A1    May 13, 2010

(30) Foreign Application Priority Data
Aug. 30, 2007 (JP) ................................. 2007-224607

(51) Int. Cl.
*G02F 1/136* (2006.01)
*G02F 1/1335* (2006.01)
*H01L 33/00* (2010.01)

(52) U.S. Cl. ............ 349/42; 349/106; 349/153; 438/26; 438/30; 257/E33.053; 257/E33.056

(58) Field of Classification Search ................... 349/187, 349/190, 153, 154, 158, 110, 111, 122, 106.42, 349/43, 58; 438/30, 26; 257/E33.053, E33.056
See application file for complete search history.

(56) References Cited

U.S. PATENT DOCUMENTS

| 5,557,436 A * | 9/1996 | Blose et al. | 349/153 |
| 7,019,800 B2 | 3/2006 | Kuo | 349/153 |
| 7,182,830 B2 * | 2/2007 | Liang et al. | 156/292 |
| 2004/0032389 A1 * | 2/2004 | Liang et al. | 345/107 |

(Continued)

FOREIGN PATENT DOCUMENTS

JP     10-221700     8/1998

(Continued)

OTHER PUBLICATIONS

International Search Report dated Dec. 2, 2008.

*Primary Examiner* — Brian Healy
(74) *Attorney, Agent, or Firm* — SNR Denton US LLP (57) ABSTRACT

A liquid crystal display with good reliability is provided. A pixel substrate 11 and a facing substrate 12 facing each other, a liquid crystal layer 14 sandwiched between the above-described substrates and changing an alignment direction in a region of display pixels in response to applied voltages, a seal layer 15 including an UV curable material, and arranged so as to surround the region of display pixels, thereby sealing the liquid crystal layer between the above-described substrates, TFT devices and a BM layer 17 both arranged on the pixel substrate 11, and a CF layer 20 for color display arranged on the pixel substrate 11 or the facing substrate 12 are included, and the seal layer 15 are seamlessly and continuously formed so as to overlap a part of the BM layer 17.

7 Claims, 6 Drawing Sheets

U.S. PATENT DOCUMENTS

| | | | |
|---|---|---|---|
| 2004/0209008 A1* | 10/2004 | Liang et al. | 428/1.51 |
| 2005/0140914 A1* | 6/2005 | Sawasaki et al. | 349/155 |
| 2006/0181660 A1 | 8/2006 | Kawashima et al. | 349/106 |
| 2008/0182351 A1* | 7/2008 | Sawasaki et al. | 438/30 |
| 2010/0118223 A1* | 5/2010 | Ishizaki | 349/42 |

FOREIGN PATENT DOCUMENTS

| | | |
|---|---|---|
| JP | 2001-021915 | 1/2001 |
| JP | 2004-062138 | 2/2004 |
| JP | 2005-346100 | 12/2005 |
| JP | 2006-227231 | 8/2006 |

* cited by examiner

LIQUID CRYSTAL DISPLAY AND METHOD OF MANUFACTURING THE SAME

TECHNICAL FIELD

The present invention relates to a liquid crystal display manufactured by a liquid crystal dropping method, and a method of manufacturing the same.

BACKGROUND ART

Figure 8:
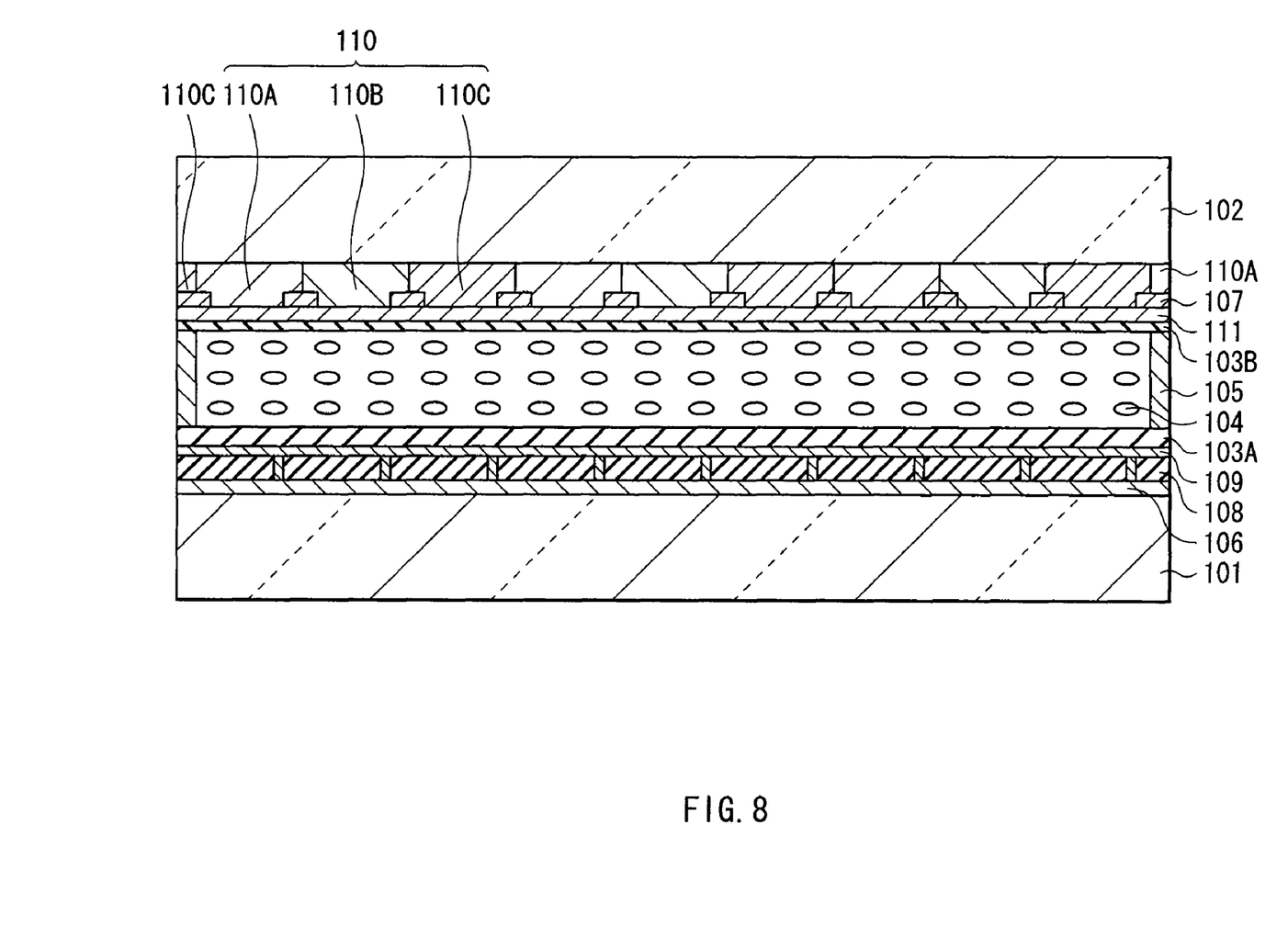
FIG. 8 is a sectional view illustrating a schematic configuration of a liquid crystal display in related art.

As illustrated in FIG. 8, a liquid crystal display typically includes a pixel substrate 101 which includes a TFT (Thin Film Transistor) device layer 106, a pixel electrode layer 109, a planarizing layer 108 and an alignment film 103A formed thereon, and a facing substrate 102 which is formed so as to face the pixel substrate 101, and includes a BM (Black Matrix) layer 107, a CF (Color Filter) layer 110, a common electrode 111 and an alignment film 103B formed thereon, and a liquid crystal layer 104 which is formed between both of the above-described substrates. Moreover, a seal layer 105 is arranged between both of the above-described substrates so as to prevent a liquid crystal from being leaked and to adhere the substrates to each other.

As a method of forming a liquid crystal layer between a pixel substrate and a facing substrate in a liquid crystal display with such a configuration, a vacuum injection method in which a liquid crystal is injected after bonding the pixel substrate and the facing substrate together is typically used; however, the method needs a long time to inject the liquid crystal, so there is an issue that in the case where the areas of the substrates are larger, productivity becomes poor.

To solve the issue, a novel method called an ODF (One Drop Fill; liquid crystal dropping) method has been proposed. For example, Patent Document 1 discloses a method of dropping a liquid crystal material onto one of two substrates before bonding the two substrates together for sealing. Moreover, Patent Document 1 also discloses the use of an UV (Ultraviolet) curable sealing agent instead of a thermosetting sealing agent as a material (a sealing agent) forming a seal layer in the ODF method.

Now, the ODF method will be briefly described below. First, a pixel substrate and a facing substrate are prepared. A plurality of gate wires and a plurality of data wires which horizontally and vertically intersect one another to define a pixel region are formed on the pixel substrate. A TFT device is formed at each of intersections of the above-described gate wires and the above-described data wires, and a pixel electrode connected to the above-described TFT device is formed in the pixel region.

A BM layer for blocking the leakage of light in the above-described gate wires, the above-described data wires and a TFT formation region, and red, green and blue CF layers are formed on the facing substrate, and a common electrode is formed thereon. Alignment films for initial liquid crystal alignment are formed on the above-described pixel substrate and the above-described facing substrate.

Next, after the pixel substrate is coated with a sealing agent in the shape of a frame, a liquid crystal layer is formed by dropping a liquid crystal into the frame. In the ODF method, an UV curable (or an UV curable/thermosetting) sealing agent is typically used. It is because in a step of curing the sealing agent in a later step, in the case where a thermosetting sealing agent is used as the sealing agent in a state in which the liquid crystal layer is formed on a bonded substrate, the sealing agent may be leaked during heating to cause contamination of the liquid crystal with the sealing agent.

Next, after the pixel substrate and the facing substrate are bonded together, UV light is applied by an UV irradiator to cure the above-described sealing agent, thereby to adhere the above-described pixel substrate and the above-described facing substrate to each other. After that, a cell cutting step and a final test step are performed. Thus, in the ODF method, after the liquid crystal is directly dropped onto the pixel substrate, both substrates are bonded together. Therefore, the ODF method has an advantage that the liquid crystal layer is formed in a shorter time, compared to the vacuum injection method.

Patent Documents 2 to 4 disclose configurations of typical liquid crystal displays.

[Patent Document 1] Japanese Unexamined Patent Application Publication No. 2004-62138

[Patent Document 2] Japanese Unexamined Patent Application Publication No. 2001-21915

[Patent Document 3] Japanese Unexamined Patent Application Publication No. 2005-346100

[Patent Document 4] Japanese Unexamined Patent Application Publication No. 2006-227231

DISCLOSURE OF THE INVENTION

As described above, in the ODF method, a sealing agent in a raw (uncured) state comes into contact with a liquid crystal, so to reduce the contact time, it is necessary to cure the sealing agent through the use of UV light. It is necessary to apply UV light from one of both substrates. In the case where the UV light is applied from the facing substrate side, to prevent the BM layer arranged on the facing substrate side from blocking the application of UV light to the seal layer, it is necessary to arrange the seal layer outside the BM layer. Therefore, outside dimensions of the liquid crystal display are increased. On the other hand, in the case where UV light is applied from the pixel substrate side, in the case of a low-temperature polysilicon TFT, a circuit is arranged in a so-called frame region, and even if UV light is applied from the pixel substrate side, an unirradiated region may be formed in the seal layer. Therefore, visual quality (reliability) at the time of long-time driving declines. In other words, in the method in related art, it is difficult to achieve both of a size reduction in the liquid crystal display and fast and reliable curing of the seal layer.

The present invention is made to solve the above-described issues of related art, and an object of the invention is to provide a liquid crystal display having reduced outside dimensions, and having high reliability by ensuring fast and reliable curing of a seal layer, and a method of manufacturing the same.

A liquid crystal display of the invention includes: a pair of substrates facing each other; a liquid crystal layer sandwiched between the pair of substrates, alignment direction of the liquid crystal layer in a region of display pixels being allowed to change in response to applied voltages; a seal layer including a material made from an energy ray curable material, and arranged so as to surround the region of display pixels, thereby sealing the liquid crystal layer between the pair of substrates; TFT devices arranged on one substrate of the pair of substrates; a black matrix layer arranged on the substrate on which the TFT devices are formed; and a color filter layer for color display arranged on one of the pair of substrates, in which the seal layer is seamlessly and continuously formed so as to overlap a part of the black matrix layer.

A method of manufacturing a liquid crystal display of the invention includes a step of preparing first and second substrates; a step of forming TFT devices on the first substrate; a step of forming a black matrix layer on the first substrate; a step of forming a seal layer with the shape of a seamless and continuous frame on one of the first and second substrates; a step of dropping a liquid crystal in the frame formed of the seal layer; a step of bonding the first and second substrates together; and a step of curing the seal layer by applying an energy ray from the second substrate side to the first and second substrates in a state in which they are bonded together, in which in a state in which the first and second substrates are bonded together, the seal layer is arranged so as to overlap a part of the black matrix layer.

In the liquid crystal display and the method of manufacturing the same of the invention, the black matrix layer is arranged on the substrate on which the TFT devices are formed, so energy irradiation is performed on the seal layer without blocking energy irradiation by the black matrix layer.

According to the liquid crystal display and the method of manufacturing the same of the invention, the black matrix layer is formed on the substrate on which the TFT devices are formed, so the black matrix layer and the seal layer are arranged so as to overlap each other, thereby the outside dimensions of the liquid crystal display are reduced, and the seal layer is cured fast and reliably.

In particular, in the case where the color filter layer is formed so as to avoid the seal layer, the seal layer is irradiated with an energy ray without blocking the energy ray by the color filter layer. Therefore, the seal layer is sufficiently cured.

Moreover, in the case where a circuit configured of the TFT devices is arranged in a frame region of the pixel substrate, when the black matrix layer is arranged on the TFT devices in the frame region, the above-described circuit is protected from the energy ray. Therefore, the seal layer is cured without changing TFT characteristics (voltage-current characteristics).

Further, in the case where the color filter layer is arranged on the substrate opposite to the substrate on which the TFT devices are arranged, the energy ray is mostly absorbed by the color filter layer. Therefore, the energy ray is prevented from being applied directly (but through a transparent base and a transparent material) to the liquid crystal layer, thereby the liquid crystal layer is protected.

Moreover, in the case where the color filter layer is arranged on the substrate on which the TFT devices are arranged, even if a dummy pattern of the color filter layer is arranged, when irradiation is performed from the substrate opposite to the substrate on which the TFT devices are arranged, the energy ray applied to the seal layer is not blocked by the color filter layer, thereby curing of the seal layer is ensured.

Further, in the case where a material made from a thermal polymerization type material is mixed with the seal layer, the time of curing the seal layer is further reduced, and the seal layer is polymerized more densely.

BEST MODES FOR CARRYING OUT THE INVENTION

A best mode for carrying out the invention (hereinafter simply referred to as embodiment) will be described in detail referring to accompanying drawings.

Figure 1:
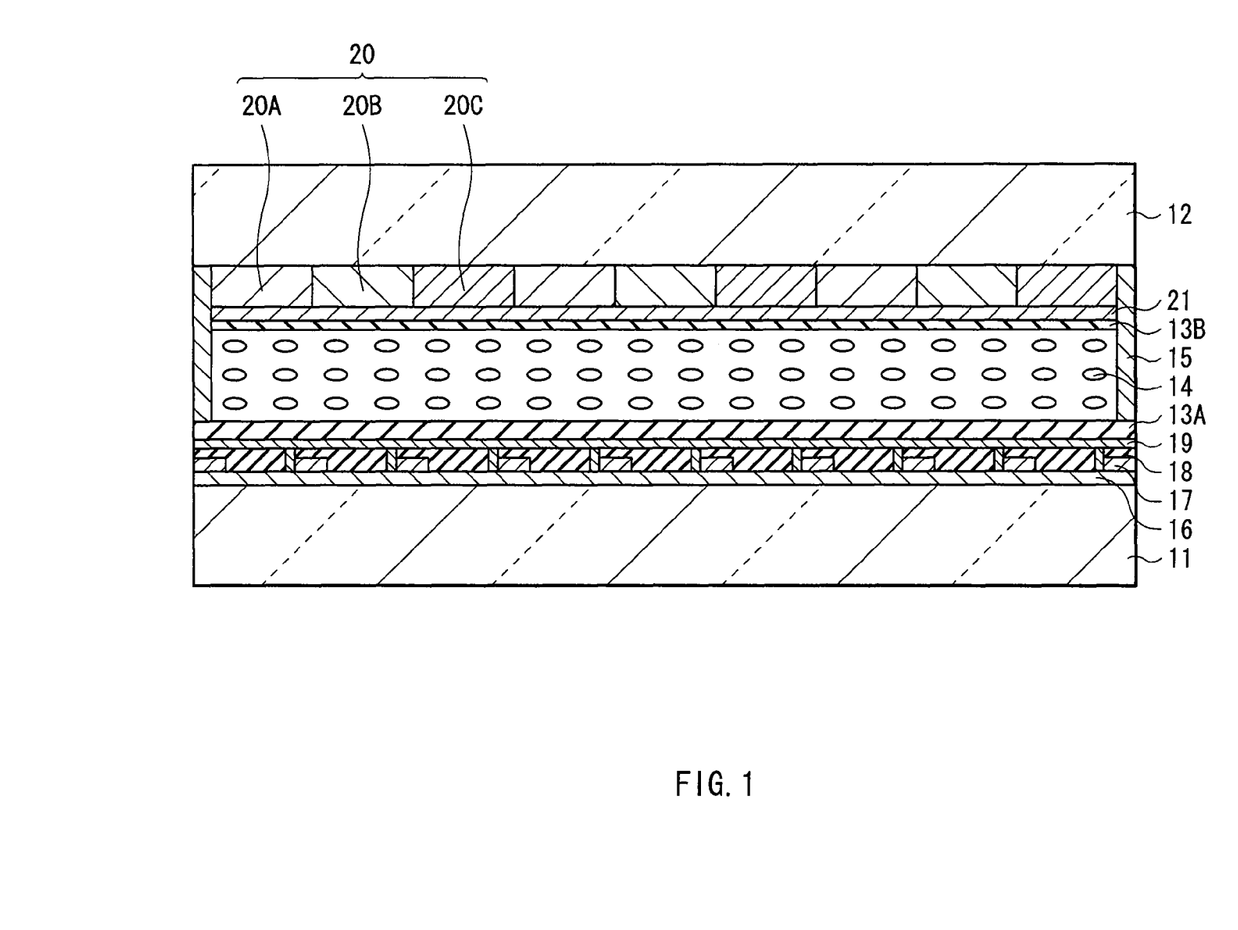
FIG. 1 is a sectional view illustrating a schematic configuration of a liquid crystal display according to an embodiment of the invention.

FIG. 1 illustrates a schematic sectional configuration of a liquid crystal display according to an embodiment of the invention.

For example, as illustrated in FIG. 1, the transmissive liquid crystal display includes a pixel substrate 11 and a facing substrate 12 which are arranged so as to face each other, and a liquid crystal layer 14 sealed between the pixel substrate 11 and the facing substrate 12. The transmissive liquid crystal display further includes a seal layer 15 isolating the liquid crystal layer 14 from its surroundings. Moreover, a spacer, which is not illustrated, for keeping a space between both substrates, for example, a columnar spacer is formed between the pixel substrate 11 and the facing substrate 12.

The pixel substrate 11 and the facing substrate 12 which will be described later are made of a transparent (light transmissive) material such as glass. A TFT device layer 16 including a plurality of TFT devices are formed on the pixel substrate 11, and a BM layer 17 is formed so as to be laid over the TFT device layer 16. Moreover, a planarizing layer 18, a pixel electrode layer 19 and an alignment film 13A are formed in this order on the TFT device layer 16 and the BM layer 17. On the other hand, a CF layer 20, a common electrode 21 and an alignment film 13B are formed on the facing substrate 12. In addition, in the drawing, the TFT device layer 16 and the pixel electrode layer 19 are illustrated as if the TFT device layer 16 and the pixel electrode layer 19 are arranged continuously between pixels; but in practice, arranged separately between the pixels.

The TFT device layer 16 constitutes a drive circuit for driving the liquid crystal layer 14 arranged in a region of display pixels where an image is displayed, and is arranged in each display pixel. The TFT device layer 16 includes, for example, a CMOS (Complementary Metal Oxide Semiconductor) type or NMOS (Negative polarity Metal Oxide Semiconductor) type transistor, a capacitor (auxiliary capacitor) or the like, and constitutes a so-called active type drive circuit. Moreover, a control circuit, which is not illustrated, made of TFT devices for controlling the liquid crystal display is arranged in an outer region (a so-called frame region) surrounding the region of display pixels.

The BM layer 17 is provided to block a section except for the display pixel (for example, the TFT device layer 16) from light. Light entering from a light entry side is selectively blocked, and light other than the light is transmitted to a light emission side. Moreover, the BM layer 17 has a function of preventing color mixture between the adjacent CF layers (for example, at a boundary between a CF 20A and a CF 20B).

The planarizing layer 18 has a sufficient thickness to remove asperities of the TFT device layer 16 for planarization. The surface of the planarizing layer 18 is in a substantially perfect flat state, and the pixel electrode layer 19 is formed on the surface of the planarizing layer 18. The planarizing layer 18 is typically colorless and transparent.

The pixel electrode layer 19 is an electrode on one side for applying a voltage to the liquid crystal layer 14, and includes a plurality of pixel electrodes. Each of the pixel electrodes is separately arranged in each display pixel so that the pixel electrodes are arranged in an alignment pattern such as a matrix or a zigzag. Then, a potential is independently and individually supplied to each pixel electrode.

The CF layer 20 includes a red filter 20A, a green filter 20B and a blue filter 20C, and these filters of three colors are alternately and repeatedly arranged. The CF layer 20 is formed, for example, by directly spraying a coloring solution including a dye, a pigment or the like to a photosensitive resin film. In the embodiment, the CF layer 20 is arranged on the facing substrate 12 side except for the top surface of the seal layer 15. In other words, the CF layer 20 is formed only in a frame formed of the seal layer 15.

The common electrode 21 is an electrode on the other side for applying a voltage to the liquid crystal layer 14, and continuously extends to a region facing the pixel electrode layer 19. Then, a common potential is supplied to the common electrode 21. The common electrode 21 is made of, for example, a transparent electrode material such as indium tin oxide (ITO).

The alignment films 13A and 13B align the liquid crystal layer 14 in a predetermined alignment state. The alignment film 13A is formed on the pixel substrate 11 so as to be laid over the pixel electrode layer 19. On the other hand, the alignment film 13B is formed on the facing substrate 12 so as to be laid over the common electrode 21.

The liquid crystal layer 14 is provided to modulate incident light by changing its alignment state in response to the application of a voltage between the pixel electrode layer 19 and the common electrode 21. The liquid crystal mode of the liquid crystal layer 14 is not specifically limited, and may be, for example, an ECB (Electrically Controlled Birefringence) mode, a VA (Vertical Alignment) mode or the like. Moreover, an arbitrary liquid crystal material may be used for the liquid crystal layer 14.

The seal layer 15 seals a space arranged between the pixel substrate 11 and the facing substrate 12 so as to enclose the liquid crystal layer 14 in the space between these substrates. In the embodiment, to reduce the outside dimensions of the liquid crystal display, the seal layer 15 is arranged so as to overlap a part of the BM layer 17 in the region of display pixels. As will be described later, as a material (a sealing agent) of which the seal layer 15 is made, an energy ray curable sealing agent is used. For example, an UV curable sealing agent is suitable. The seal layer 15 does not have a liquid crystal injection opening, and is seamlessly and continuously formed.

Next, referring to FIGS. 4 to 7, a method of manufacturing the above-described liquid crystal display will be described below.

Figure 4:
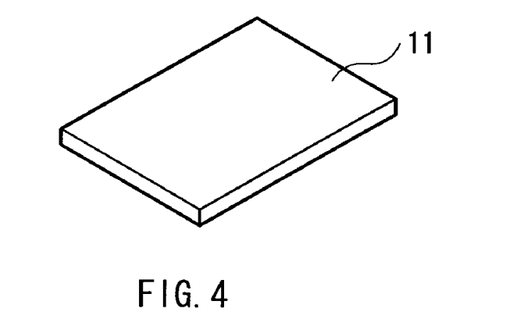
FIG. 4 is a sectional view illustrating a step of manufacturing the liquid crystal display according to an example of the invention.

First, as illustrated in FIG. 4, the pixel substrate 11 is prepared. At this time, the pixel substrate 11 is in a state in which the TFT device layer 16, the BM layer 17, the planarizing layer 18, the pixel electrode layer 19 and the alignment film 13A are formed thereon.

When the BM layer 17 is formed on the pixel substrate 11, in the case where UV irradiation which will be described later is performed, UV light is not blocked by the BM layer 17. Therefore, UV irradiation is sufficiently performed on the seal layer 15. Moreover, the BM layer 17 may be formed so as to be laid over the TFT devices constituting the control circuit in the above-described frame region. In this case, UV irradiation on the TFT devices in the frame region is prevented. Therefore, deterioration in characteristics of the TFT devices in the frame region is prevented.

Figure 5:
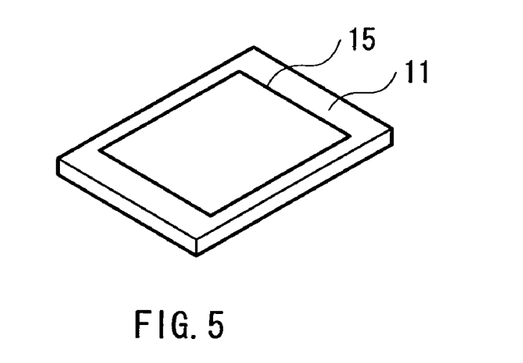
FIG. 5 is a sectional view illustrating a step following the step of FIG. 4.

Next, as illustrated in FIG. 5, the seal layer 15 made of the UV curable sealing agent is seamlessly and continuously formed in the shape of a frame so as to surround the region of display pixels on the pixel substrate 11. Next, the liquid crystal layer 14 is formed inside the seal layer 15 by dropping.

Next, the liquid crystal layer 14 is formed inside the seal layer 15 arranged on the pixel substrate 11 by dropping by an ODF method. The liquid crystal layer 14 is prevented from being leaked to the outside of the seal layer 15. At this time, a necessary amount of a liquid crystal is determined from a volumetric capacity in a liquid crystal cell.

Figure 6A:
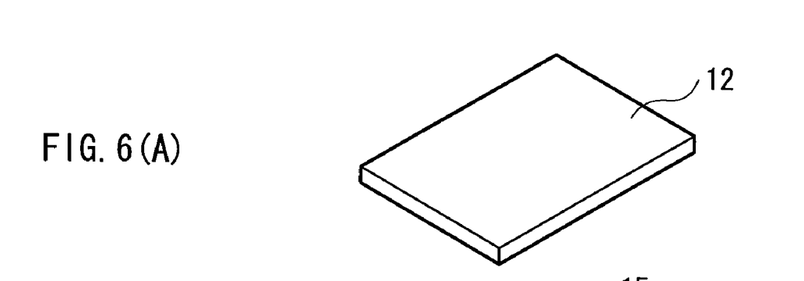
FIG. 6 is a sectional view illustrating a step following the step of FIG. 5.

Next, the facing substrate 12 illustrated in FIG. 6(A) is prepared. At this time, the facing substrate 12 is in a state in which the CF layer 20, the common electrode 21, and the alignment film 13B are formed thereon.

When the CF layer 20 is arranged on the facing substrate 12 side, in the case where UV irradiation which will be described later is performed, the above-described UV light applied is mostly absorbed by the CF layer 20. Therefore, the liquid crystal layer 14 is protected from the above-described UV light applied.

Figure 6B:
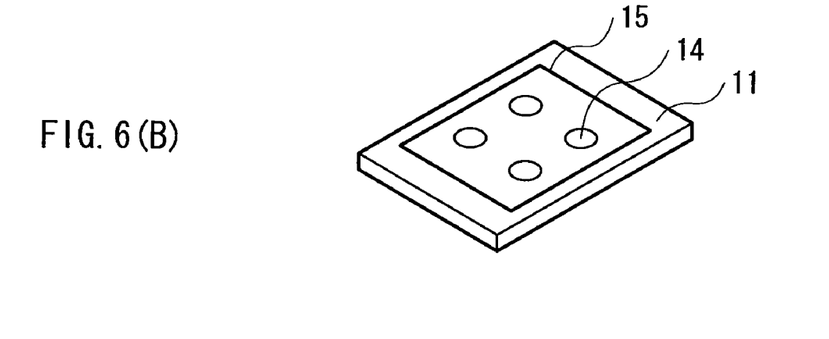

Next, the facing substrate 12 illustrated in FIG. 6(A) and the pixel substrate 11 illustrated in FIG. 6(B) are arranged so as to face each other, and are bonded together in a vacuum. At this time, the seal layer 15 and the BM layer 17 are in a state in which they overlap each other completely or partially. In addition, when the facing substrate 12 is laminated, the whole cell is uniformly filled with the liquid crystal within a fixed time.

Figure 7:
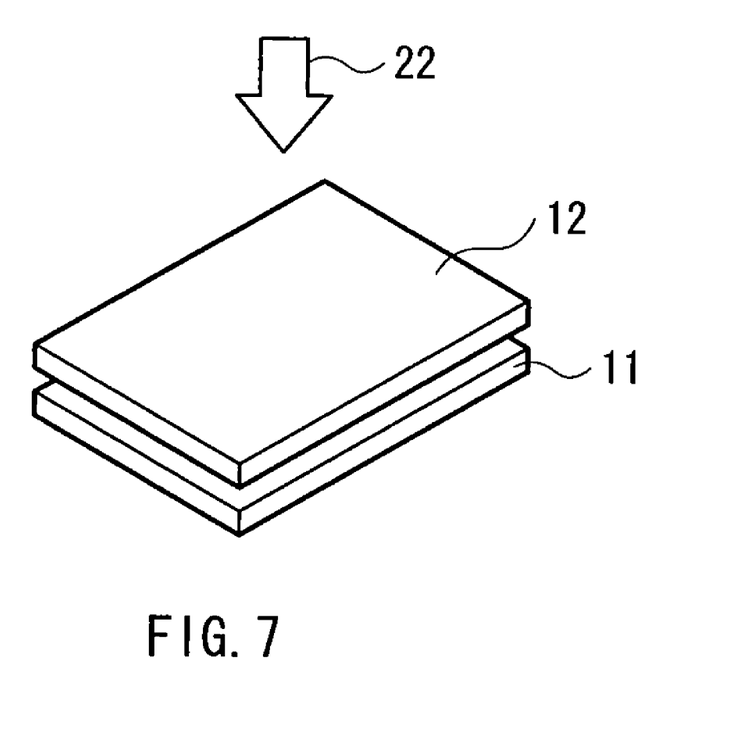
FIG. 7 is a sectional view illustrating a step following the step of FIG. 6.

After that, as illustrated in FIG. 7, UV irradiation is performed from the facing substrate 12 side to cure the seal layer 15. At this time, the BM layer 17 is arranged on the pixel substrate 11 side, so without blocking UV irradiation by the BM layer 17, the sealing agent is sufficiently cured.

Moreover, the seal layer 15 may include a thermosetting sealing agent. In this case, the time of curing the sealing agent is reduced by heating with UV irradiation.

Figure 2:
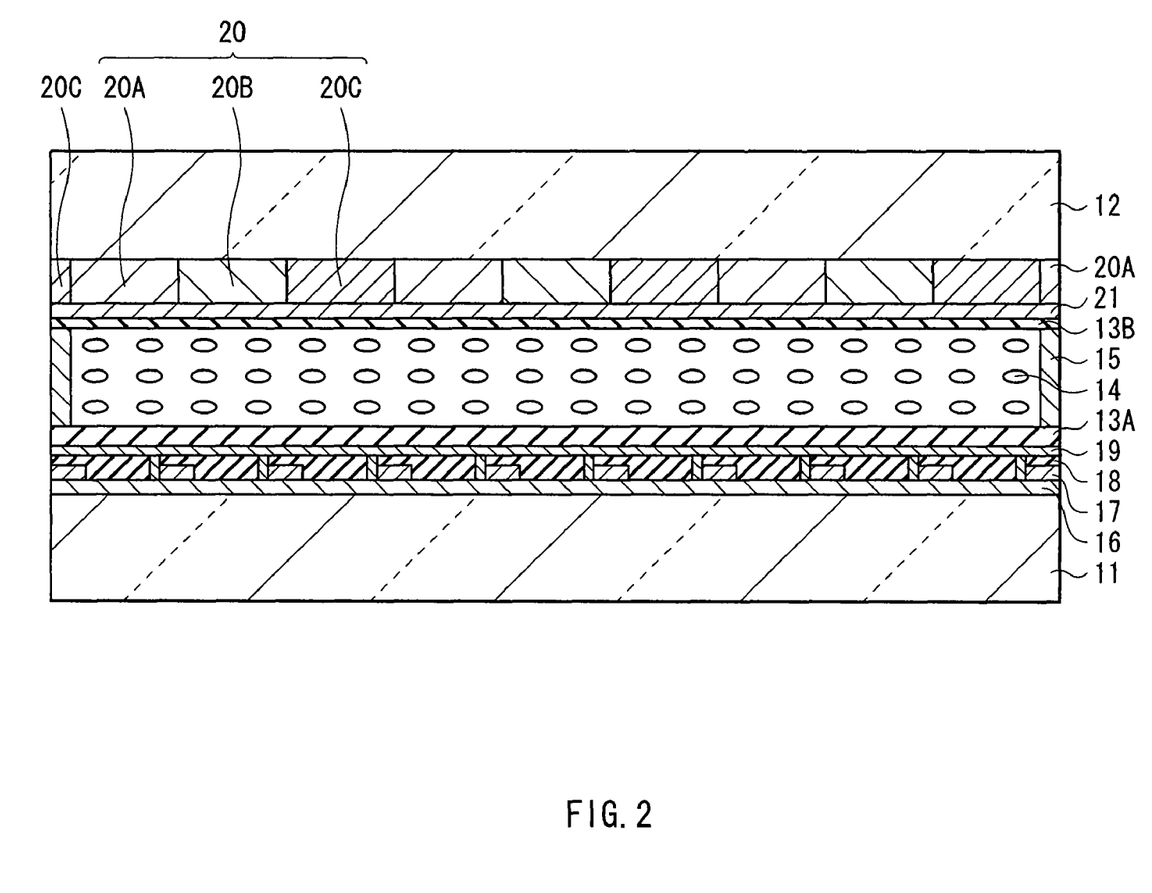
FIG. 2 is a sectional view illustrating a schematic configuration of a liquid crystal display according to a comparative example.

As illustrated in FIG. 1, the CF layer 20 is preferably arranged so as to avoid the seal layer 15. In this case, UV light applied to the seal layer 15 is prevented from being blocked by the CF layer 20 with an UV light transmittance of smaller than 1%. Therefore, compared to a comparative example illustrated in FIG. 2 in which the CF layer 20 (20A and 20C) is formed so as to be laid over the seal layer 15, the seal layer 15 is sufficiently cured. In other words, only a pattern which passes UV light therethrough is preferably arranged in a region facing the seal layer 15 in the facing substrate 12.

Figure 3:
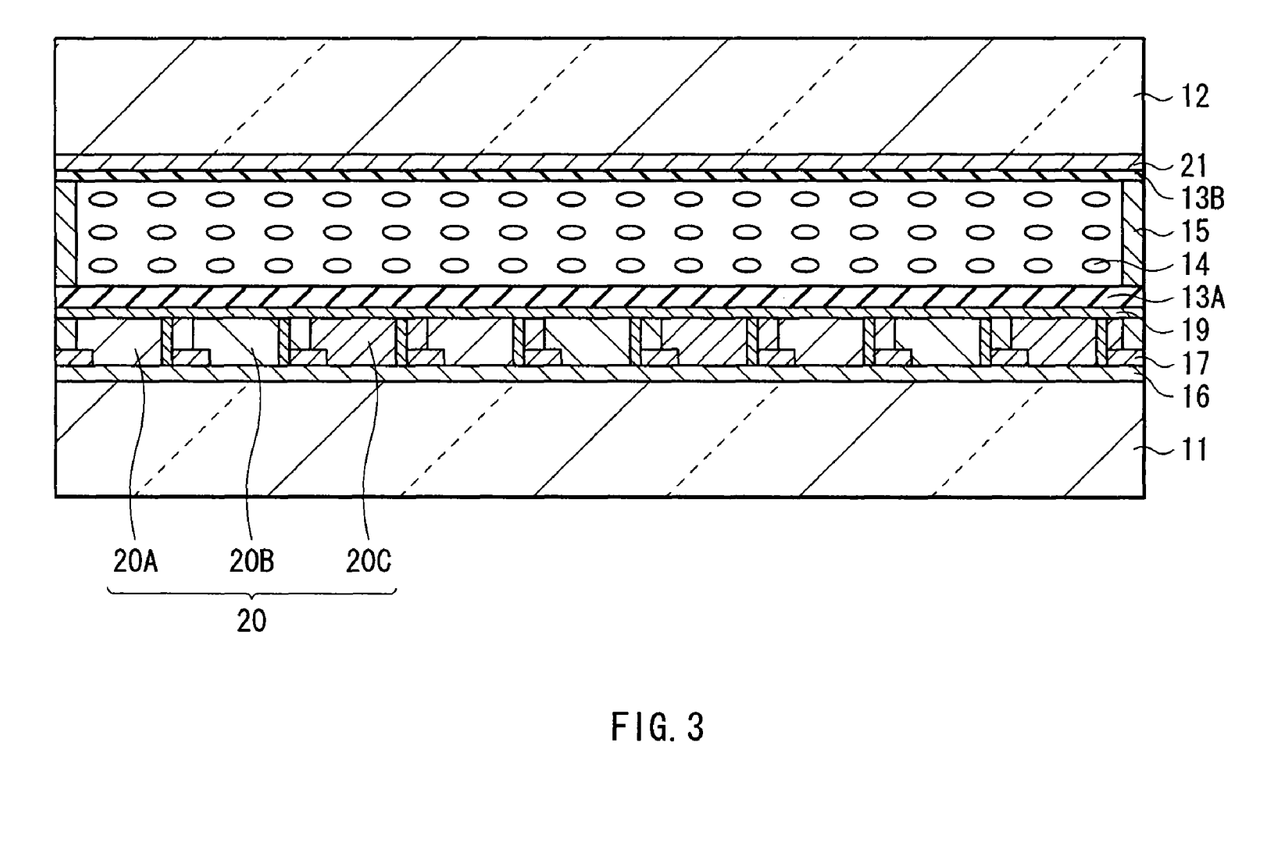
FIG. 3 is a sectional view illustrating a schematic configuration of a liquid crystal display according to a modification example.

In this case, for performing the above-described UV irradiation, the CF layer 20 may be arranged not only in the above-described manner but also in the following manner. For example, as illustrated in FIG. 3, the CF layer 20 may be arranged on the pixel substrate 11 side. In this case, it is not necessary to arrange the CF layer 20 so as to avoid the seal layer 15. In this case, according to a method of forming a typical CF layer, a mask of a color filter for one color is used, and the above-described mask is moved by every color filter (for example, a red filter, a green filter and a blue filter) to form a pattern. Therefore, a so-called dummy pattern (20A, 20C (refer to FIG. 2)) is formed outside the region of display pixels. Therefore, UV light is blocked by the dummy pattern, and the seal layer 15 may not be cured sufficiently. Therefore, when the CF layer 20 is arranged on the pixel substrate 11 side, UV light is applied to the seal layer 15 without regard to the dummy pattern.

In addition, in the embodiment, the seal layer 15 is formed on the pixel substrate 11 side, but the seal layer 15 may be formed on the facing substrate 12 side. Moreover, a large-sized glass substrate may be used for the pixel substrate 11 and the facing substrate 12. In the case where a plurality of liquid crystal panels are formed of the above-described glass substrate, the glass substrate is cut and separated into liquid crystal panels.

Now, the sealing agent of which the above-described seal layer 15 is made will be described in detail below.

The above-described sealing agent is an energy ray curable sealing agent which is cured by irradiation with an energy ray such as light energy, and is, for example, a light curing sealing agent including a light curing resin and a photoradical polymerization initiator. In particular, an UV curable sealing agent is suitable. Moreover, a thermosetting agent, a silane coupling agent and a filler may be included. In addition, a sealing agent which is cured by an energy ray except for light may be used.

The above-described light curing resin includes a radical polymerizable functional group, and is polymerized by irradiation with light such as UV light to be cured.

The above-described radical polymerizable functional group means a functional group which is polymerizable by an active energy ray such as UV light, and examples of the radical polymerizable functional group include a (metha)acrylic group, an allyl group and the like.

Examples of the light curing resin having the above-described radical polymerizable functional group include (metha)acrylate, an unsaturated polyester resin and the like. Only one kind or a combination of two or more kinds selected from them may be used. Among them, (metha)acrylate is suitable in terms of rapid reaction progress or good adhesion. In this description, (metha)acrylic means acrylic or meth acryl.

The above-described (metha)acrylate is not specifically limited, and examples of the above-described (metha)acrylate include urethane (metha)acrylate including a urethane bond, epoxy (metha)acrylate derived from a compound having a glycidyl group and (metha)acrylic acid, and the like.

The above-described urethane (metha)acrylate is not specifically limited, and examples of the above-described urethane (metha)acrylate include derivatives of diisocyanate such as isophorone diisocyanate and a reactive compound addition-reacting with isocyanate such as acrylic acid or hydroxyethylacrylate, and the like. These derivatives may be chain-extended with caprolactone, polyol or the like. For example, commercially available products of the above-described urethane (metha)acrylate include U-122P, U-340P, U-4HA and U-1084A (all of which are available from Shin-nakamura Chemical Corporation), and KRM7595, KRM7610 and KRM7619 (all of which are available from Daicel UCB Co.), and the like.

The above-described epoxy (metha)acrylate is not specifically limited, and examples of the above-described epoxy (metha)acrylate include epoxy (metha)acrylates derived from an epoxy resin such as a bisphenol A type epoxy resin or propylene glycol diglycidyl ether and (metha)acrylic acid, and the like. Moreover, for example, commercially available products of the above-described epoxy (metha)acrylate include EA-1020, EA-6320 and EA-5520 (all of which are available from Shin-nakamura Chemical Corporation), and epoxy ester 70PA and epoxy ester 3002A (all of which are available from Kyoeisha Chemical Co., Ltd.), and the like.

Examples of other (metha)acrylate include methyl methacrylate, tetrahydrofurfuryl methacrylate, benzyl methacrylate, isobonyl methacrylate, 2-hydroxyethyl methacrylate, glycidyl methacrylate, (poly)ethylene glycol dimethacrylate, 1,4-butanediol dimethacrylate, 1,6-hexanediol dimethacrylate, trimethylolpropane triacrylate, pentaerythritol triacrylate, glycerol dimethacrylate and the like.

As described above, the sealing agent may include a thermal polymerization type sealing agent (an epoxy resin). In this case, the time of curing the sealing agent is reduced by performing UV irradiation and heating. Examples of the above-described epoxy resin include a phenol novolac type epoxy resin, a cresol novolac type epoxy resin, a biphenyl novolac type epoxy resin, a trisphenol novolac type epoxy resin, a dicyclopentadiene novolac type epoxy resin, a bisphenol A type epoxy resin, a bisphenol F type epoxy resin, a 2,2'-diallyl bisphenol A type epoxy resin, a bisphenol S type epoxy resin, a hydrogenated bisphenol A type epoxy resin, a resin of a bisphenol A type epoxy with propylene oxide, a biphenyl type epoxy resin, a naphthalene type epoxy resin, a resorcinol type epoxy resin, glycidyl amines and the like.

For example, commercially available products of the above-described epoxy resin include NC-3000S (available from Nippon Kayaku Co., Ltd.) as the phenyl novolac type epoxy resin, EPPN-501H and EPPN-501H (all of which are available from Nippon Kayaku Co., Ltd.) as the trisphenol novolac type epoxy resin, NC-7000L (available from Nippon Kayaku Co., Ltd.) as the dicyclopentadiene novolac type epoxy resin, EPICLON 840S and EPICLON 850CRP (all of which are available from Dainippon Ink and Chemicals Inc.) as the bisphenol A type epoxy resin, EPICOAT 807 (available from Japan Epoxy Resin Co., Ltd.) and EPICLON 830 (available from Dainippon Ink and Chemicals Inc.) as the bisphenol F type epoxy resin, RE310NM (available from Nippon Kayaku Co., Ltd.) as the 2,2'-diallyl bisphenol A type epoxy resin, EPICLON 7015 (available from Dainippon Ink and Chemicals Inc.) as the hydrogenated bisphenol type epoxy resin, epoxy ester 3002A (available from Kyoeisha Chemical Co., Ltd.) as the resin of a bisphenol A type epoxy with propylene oxide, EPICOAT YX-4000H and YL-6121H (all of which are available from Japan Eopxy Resin Co., Ltd.) as the biphenyl type epoxy resin, EPICLON HP-4032 (available from Dainippon Ink and Chemicals Inc.) as the naphthalene type epoxy resin, DENACOL EX-201 (Nagase ChemteX Corporation) as the resorcinol type epoxy resin, EPICLON 430 (available from Dainippon Ink and Chemicals Inc.) and EPICOAT 630 (available from Japan Epoxy Resin Co., Ltd.) as the glycidyl amines, and the like.

As the above-descried thermosetting resin, an epoxy/(metha)acrylic resin including at least one (metha)acrylic group and at least one epoxy group in one molecule is suitably used.

Examples of the above-described epoxy/(metha)acrylic resin include a compound obtained by reacting a part of the epoxy group of the above-described epoxy resin with (metha)acrylic acid in the presence of a basic catalyst according to a common procedure, a compound obtained by reacting 1 mole of bi- or higher functional isocyanate with ½ mole of (metha)acrylic monomer having a hydroxyl group, and then with ½ mole of glycidol, a compound obtained by reacting (metha)acrylate having an isocyanate group with glycidol, and the like. For example, commercially available products of the above-described epoxy/(metha)acrylic resin include UVAC1561 (available from Daicel UCB Co.) and the like.

Moreover, the above-described sealing agent includes a photoradical polymerization initiator represented by Formula (1).

[Chemical Formula 1]

In Formula (1), Ar represents an unsubstituted or substituted phenyl group or an unsubstituted or substituted biphenyl group.

X represents O, S, NH or NY (where Y is an alkyl group with 1 to 4 carbon atoms) or is not existent.

At least one of $R^1$ to $R^4$ has a thiol group, and $R^1$ represents a hydrogen group, an unsubstituted or substituted straight-chain or branched alkyl group with 1 to 12 carbon atoms, an alkyl group with 2 to 20 carbon atoms which has 1 to 9 groups represented by —O—, —NY—, —S— or —SS— in a main chain or a side chain, or a benzyl group unsubstituted or substituted with 1 or 2 —CH$_2$SH.

$R^2$ and $R^3$ each represent an unsubstituted or substituted alkyl group with 1 to 8 carbon atoms, an unsubstituted alkenyl group with 3 to 6 carbon atoms or an alkenyl group with 3 to 6 carbon atoms substituted with 1 to 5 —SH groups, a phenyl group, a chlorophenyl group, a —Y—O— phenyl group, a —Y—S— phenyl group, or a phenyl—alkyl with 1 to 3 carbon atoms—group.

$R^4$ represents a morpholino group unsubstituted or substituted with 1 or 2 —CH$_2$SH, a piperidino group unsubstituted or substituted with 1 or 2 —CH$_2$SH, or NY$_2$. Detailed description will be given below.

When the photoradical polymerization initiator having a thiol group in a molecule is used, the generation of a residue after curing reaction which is an issue in conventional sealing agents is prevented, and display failure due to contamination of the liquid crystal is prevented. Moreover, when the photoradical polymerization initiator having a nitrogen atom and hydrogen bonded at a position of the nitrogen atom in a molecule is used, the photoradial polymerization initiator may have high reactivity. Thereby, in the sealing agent, good display characteristics and a good curing property with a low amount of light are compatible.

In the above-described Formula (1), Ar is an unsubstituted or substituted phenyl group or an unsubstituted or substituted biphenyl group.

The above-described substituted phenyl group or the above-described substituted biphenyl group is a phenyl group or a biphenyl group substituted with 1 to 5 groups selected from the group consisting of a halogen atom, an alkyl group with 1 to 12 carbon atoms, an alkenyl group with 3 to 12 carbon atoms, a cycloalkyl group with 5 to 6 carbon atoms, a phenyl—alkyl with 1 to 3 carbon atoms—group, —COOH, —COOY (where Y is an alkyl group with 1 to 4 carbon atoms) group, a —OY group, —SH, a —SY group, a —SOY group, a —SO$_2$Y group, —CN, —SO$_2$NH$_2$, a —SO$_2$NHY group, a —SO$_2$NY$_2$ group, a —NY$_2$ group, a —NHY group and a —NHCOY group.

In the above-described Formula (1), X is O, S, NH or NY, or is not existent.

In the case where the above-described X is O, S, NH or NY, a light absorption region of the photoradical polymerization initiator represented by the above-described Formula (1) is expanded, and the photoradial polymerization initiator may cope with light with a wide range of wavelengths.

In the above-described Formula (1), at least one of $R^1$ to $R^4$ has a thiol group. The above-described thiol group has reactivity with an acrylic radical, so the generation of a residue after curing is prevented, and display failure such as liquid crystal misalignment or color unevenness caused by elution of the residue into the liquid crystal is prevented. Moreover, the above-described thiol group has a high polarity, so a component of the photoradical polymerization initiator is prevented from being eluted into the liquid crystal in a state in which the light curing resin is not yet cured, and the above-described thiol group is preferable for the dropping method.

In the above-described Formula (1), $R^1$ is a hydrogen group, an unsubstituted or substituted straight-chain or branched alkyl group with 1 to 12 carbon atoms, an alkyl group with 2 to 20 carbon atoms which has 1 to 9 groups represented by —O—, —NY—, —S— and —SS— in a main chain or a side chain, or an unsubstituted benzyl group or a benzyl group substituted with 1 or 2 —CH$_2$SH.

Moreover, in the case where $R^1$ is an alkyl group with 2 to 20 carbon atoms which has 1 to 9 groups represented by —O—, —NY—, —S— and —SS— in a main chain or a side chain, the alkyl group may be further substituted with 1 to 5 —SH. Further, in the case where $R^1$ is a benzyl group unsubstituted or substituted with 1 or 2 —CH$_2$SH, the benzyl group may be further substituted with an alkyl group with 1 to 4 carbon atoms.

In the above-described Formula (I), $R^2$ and $R^3$ is an unsubstituted or substituted alkyl group with 1 to 8 carbon atoms, an unsubstituted alkenyl group with 3 to 6 carbon atoms or an alkenyl group with 3 to 6 carbon atoms substituted with 1 to 5 —SH groups, a phenyl group, a chlorophenyl group, a —Y—O— phenyl group, a —Y—S— phenyl group, or a phenyl—alkyl with 1 to 3 carbon atoms—group.

The above-described substituted alkyl group with 1 to 8 carbon atoms is an alkyl group with 1 to 8 carbon atoms substituted with —OH, an alkoxy group with 1 to 4 carbon atoms, —SH, —CN, a —COOY group, a —YCOO— group, a —NY$_2$ group or —NHY.

In the above-described Formula (I), $R^4$ is a morpholino group unsubstituted or substituted with 1 or 2 —CH$_2$SH, a piperidino group unsaturated or substituted with 1 or 2 —CH$_2$SH, or a —NY$_2$ group.

The photoradical initiator represented by the above-described Formula (1) includes a nitrogen atom and hydrogen bonded at a position of the nitrogen atom, thereby reactivity is improved, so a curing resin composition for the liquid crystal display of the invention exhibits a good curing property even with a low amount of light.

Examples of the photoradical polymerization initiator represented by the above-described Formula (1) include a compound obtained by reaction of a ketone compound including a halogen-substituted aromatic group and an α amino aliphatic group and dithiol, and the like. More specifically, examples of the photoradical polymerization initiator include a compound obtained by reacting 1-(4-fluorophenyl)-2-dimethylamino-2-benzyl-propano-1-one and 1,4-butanedithiol through the use of anhydrous dimethylacetamide, 1-[4-(3-mercaptopropylthio)phenyl]-2-methyl-2-morpholine-4-yl-propano-1-one, 1-[4-(10-mercaptodecanylthio)phenyl]-2-methyl-2-morpholine-4-yl-propane-1-one, 1-(4-{2-[2-(2-mercaptoethoxy)ethoxy]ethylthio}phenyl)-2-methyl-2-morpholine-4-yl-propano-1-one, 1-[3-(mercaptopropylthio)phenyl]-2-dimethylamino-2-benzyl-propano-1-one, 1-[4-(3-mercaptopropylamino)phenyl]-2-dimethylamino-2-benzylpropano-1-one, 1-[4-(3-mercapto-propoxy)phenyl]-2-methyl-2-morpholine-4-yl-propano-1-one, and the like.

The above-described ketone compound including a halogen-substituted aromatic group and an α amino aliphatic group is not specifically limited, and examples of the ketone compound including a halogen-substituted aromatic group and an α amino aliphatic group include a compound obtained by reacting an oxirane compound and secondary amine (having α hydrogen), in which the oxirane compound obtained by reacting aliphatic group ketone having halogen-substituted aromatic group-α-position halogen and metal alkoxide, and the aliphatic group ketone having halogen-substituted aromatic group-α-position halogen obtained by halogenating α-position hydrogen of the aliphatic group ketone having halogen-substituted aromatic group-α-position hydrogen by a common procedure, and the like.

More specifically, for example, a method of obtaining 1-(4-fluorophenyl)-2-methyl-2-morpholine-4-yl-propano-1-one by processing 1-(4-fluorophenyl)-2-methyl-2-bromo-propano-1-one, which is obtained by reacting 1-(4-fluorophenyl)-2-methyl-propano-1-one with $Br_2$, with sodium methoxide to obtain a product, and then reacting the product with morpholine, and the like are used.

Preferable lower and upper limits of the content of the photoradical polymerization initiator represented by the above-described Formula (1) is 0.1 parts by weight and 10 parts by weight, respectively, with respect to 100 parts by weight of the light curing resin. When the content is smaller than 0.1 parts by weight, the reactivity of the photoradical polymerization initiator may be insufficient, and when the content exceeds 10 parts by weight, excessive absorption in a surface irradiated with light may occur to cause a difference in the degree of curing. A more preferable lower limit is 0.5 parts by weight, and a more preferable upper limit is 5 parts by weight.

Moreover, the sealing agent may include a thermosetting agent.

The above-described thermosetting agent is provided to react a (metha)acrylic group or the like in the sealing agent by heating to form cross links, and has a role in improving adhesion and moisture resistance after curing.

As such a thermosetting agent, a hydrazide compound such as 1,3-bis[hydrazinocarbonoethyl-5-isopropylhydantoin], dicyandiamide, a guanidine derivative, an imidazole derivative such as 1-cyanoethyl-2-phenylimidazole, N-[2-(2-methyl-1-imidazolyl)ethyl]urea, 2,4-diamino-6-[2'-methylimidazolyl-(1')]-ethyl-s-triazine, N,N'-bis(2-methyl-1-imidazolylethyl)urea, N,N'-(2-methyl-1-imidazolylethyl)-adipamide, 2-phenyl-4-methyl-5-hydroxymethylimidazole or 2-phenyl-4,5-dihydroxymethylimidazole, modified aliphatic group polyamine, acid anhydride such as tetrahydrophthalic anhydride or ethylene glycol-bis(anhydrotrimellitate), an addition product of various kinds of amines and an epoxy resin, and the like are used. Only one kind or two or more kinds selected from them may be used.

As the above-described thermosetting agent, a coating curing agent in which surfaces of solid curing agent particles are coated with fine particles is suitable. When such a coating curing agent is used, a sealing agent having high storage stability is obtained, even if a thermosetting agent is mixed with the sealing agent in advance.

Moreover, the sealing agent may include a silane coupling agent. The silane coupling agent mainly has a role as an adhesion aid for improving adhesion between the sealing agent and the pixel substrate 11 or the facing substrate 12 (a transparent substrate). The above-described silane coupling agent is not specifically limited, but for example, γ-aminopropyltrimethoxysilane, γ-mercaptopropyltrimethoxysilane, γ-glycidoxypropyltrimethoxysilane, γ-isocyanatepropyltrimethoxysilane or the like, or a silane coupling agent made of a imidazolesilane compound having a structure in which a imidazole skeleton and an alkoxysilyl group are bonded through a spacer group or the like is suitably used, because they excel in an effect of improving adhesion with the above-described substrates (the transparent substrate) or the like and they prevent leakage into the liquid crystal material due to chemical bonding with the curing resin. Only one kind or a combination of two or more kinds selected from these silane coupling agents may be used.

Moreover, the sealing agent may include a filler for the sake of improvement in adhesion by a stress distribution effect, an improvement in linear expansion coefficient or the like. The above-described filler is not specifically limited, and examples of the above-described filler include an inorganic filler such as silica, diatomite, alumina, zinc oxide, iron oxide, magnesium oxide, tin oxide, titanium oxide, magnesium hydroxide, aluminum hydroxide, manganese carbonate, barium sulfate, calcium sulfate, calcium silicate, talc, glass beads, sericite activated clay, bentonite, aluminum nitride or silicon nitride, and the like.

In the sealing agent, preferable lower and higher limits of the glass transition temperature after curing are 80° C. and 150° C., respectively. When the glass transition temperature is lower than 80° C., in the case where the liquid crystal display is manufactured through the use of the sealing agent, the moisture resistance (resistance to high temperature and high moisture) may be poor, and when the glass transition temperature exceeds 150° C., the sealing agent is too inflexible, thereby adhesion with the substrate may be poor.

The method of manufacturing the sealing agent is not specifically limited, and a method of mixing the above-described light curing resin, the photoradical polymerization initiator represented by the above-described Formula (1) and the like by a conventional known method and the like are used. At this time, to remove an ionic impurity, the sealing agent may come into contact with an ion absorptive solid such as a sheet silicate mineral.

When the sealing agent includes the above-described light curing resin and the photoradical polymerization initiator represented by the above-described Formula (1), the sealing agent has a good curing property with a low amount of light, and contamination of the liquid crystal due to elution of a component of the photoradial polymerization initiator into the liquid crystal or generation of residue is prevented, and good display characteristics is achieved. The curing resin composition for the liquid crystal display of the invention is suitably used specifically in the case where the liquid crystal display is manufactured by the dropping method.

EXAMPLE

Next, a specific example and comparative examples of the liquid crystal display according to the embodiment will be described below.

Example 1

Example 1 will be described below. An ECB mode liquid crystal display with the same configuration as illustrated in FIG. 1 as an example was formed. The liquid crystal display was formed by processes illustrated in FIGS. 4 to 6, and as a sealing agent, the same sealing agent as a sealing agent described in Example 1 of Japanese Unexamined Patent Application Publication No. 2006-22228 was used. The voltage holding ratio of the liquid crystal display was measured under the following conditions.

Applied voltage: 4 V
Applied voltage pulse frequency: 60 Hz
Accelerated holding condition: 60° C. holding of 90%

As a result, at the time of 0 h (just after formation), the voltage holding ratio was 98%, but the voltage holding ratio after 1000 h was approximately 95%, and deterioration in visual quality was hardly observed.

Comparative Example 1

Comparative Example 1 will be described below. An ECB mode liquid crystal display was formed basically by the same method and the same specifications as those in the above-described example, except for the BM layer 17. More specifically, in the configuration illustrated in FIG. 1, the liquid crystal display was formed by arranging the BM layer 17 on the facing substrate 12. Moreover, the measurement was performed under the same measurement conditions as those in the above-described example. As a result, at the time of 0 h (just after formation), the voltage holding ratio was 90%, but after 1000 h, the voltage holding ratio was reduced to approximately 45%, and the visual quality was deteriorated.

Comparative Example 2

Comparative Example 2 will be described below. An ECB mode liquid crystal display was formed basically by the same method and the same specifications as those in the above-described Comparative Example 1, except for the method of curing the seal layer 15. More specifically, UV light was applied (at a UV light transmittance of 10%) from the pixel substrate side. As a result, at the time of 0 h (just after formation), the voltage holding ratio was 98%, but the voltage holding ratio after 1000 h was reduced to approximately 90%, and the visual quality was deteriorated.

As described above, in the liquid crystal display of the embodiment, the BM layer 17 is arranged on the pixel substrate 11 side, so even if the seal layer 15 and the BM layer 17 are arranged so as to overlap each other, UV irradiation is performed on the seal layer 15 without blocking the UV irradiation by the BM layer 17. Therefore, an effect of being capable of reducing the outside dimensions of the liquid crystal display is achieved. Moreover, the seal layer 15 is cured fast and reliably, so the liquid crystal display with good reliability and good visual quality is obtained.

In particular, in the case where the CF layer 20 is formed so as to avoid the top surface of the seal layer 15, the sealing agent is irradiated with UV light without blocking the UV light by the CF layer 20. Therefore, the sealing agent is sufficiently cured.

Moreover, when the BM layer 17 is arranged so as to be laid over the TFT devices in the frame region, the TFT devices is prevented from being irradiated with UV light. Therefore, without changing TFT characteristics (voltage-current characteristics), the seal layer 15 is cured.

Further, in the case where the CF layer 20 is arranged on the facing substrate 12, the UV light is not applied directly (but through a transparent base and a transparent material) to the liquid crystal layer 14, and is mostly absorbed by the CF layer 20. Therefore, the CF layer 20 functions as a protective layer for the liquid crystal layer 14.

Moreover, in the case where the CF layer 20 was arranged on the pixel substrate 11 side, even if the seal layer 15 and the CF layer 20 are arranged so as to overlap each other, UV light applied to the seal layer 15 is not blocked. Therefore, the liquid crystal display with good reliability is provided.

Further, in the case where an acrylic material is used as the sealing agent, curing by UV irradiation is possible. Therefore, the liquid crystal display with good reliability is provided.

Moreover, in the case where the a thermal polymerization type material is mixed with the sealing agent, the time of curing the sealing agent is further reduced, and the sealing agent is polymerized more densely, thereby the liquid crystal display with good reliability is provided.

Further, in the case where an epoxy-based material is mixed with the sealing agent, thermal polymerization/curing is used with UV curing. Therefore, the liquid crystal display with good reliability and good adhesion is provided.

Although the present invention is described referring to the embodiment, the invention is not limited thereto, and may be variously modified.

The invention claimed is:

1. A liquid crystal display comprising:
    a pair of substrates facing each other;
    a liquid crystal layer sandwiched between the pair of substrates;
    a seal layer including a material made from an energy ray curable material, and arranged so as to surround a region of display pixels, the seal layer sealing the liquid crystal layer between the pair of substrates;
    thin film transistor (TFT) devices arranged on one substrate of the pair of substrates;
    a black matrix layer arranged on the substrate on which the TFT devices are arranged; and
    a color filter layer arranged on one of the pair of substrates, wherein,
        the seal layer is formed in the shape of a seamless and continuous frame and partially overlaps the black matrix layer,
        the TFT devices include (i) first TFT devices arranged in the region of display pixels and (ii) second TFT devices arranged in a frame region that is outside of the region of display pixels, and
        the black matrix layer is arranged such that a part of the black matrix layer overlaps the second TFT devices in the frame region.

2. The liquid crystal display according to claim 1, wherein the color filter layer is arranged on the substrate opposite to the substrate on which the TFT devices are arranged, and is arranged so as to avoid the seal layer.

3. The liquid crystal display according to claim 1, wherein the color filter layer is arranged on the substrate on which the TFT devices are arranged.

4. The liquid crystal display according to claim 1, wherein the energy ray curable material is an acrylic material.

5. The liquid crystal display according to claim 1, wherein the seal layer further includes a material made from a thermal polymerization type material.

6. The liquid crystal display according to claim 5, wherein the thermal polymerization type material is an epoxy-based material.

7. A method of manufacturing a liquid crystal display comprising steps of:
    preparing first and second substrates;
    forming thin film transistor (TFT) devices on the first substrate;
    forming a black matrix layer on the first substrate;
    forming a seal layer in the shape of a seamless and continuous frame on one of the first and second substrates;
    forming a liquid crystal layer by dropping the liquid crystal on a region inside the frame formed of the seal layer;

bonding the first and second substrates together; and curing the seal layer by applying an energy ray from the second substrate side to the first and second substrates bonded together, wherein, the seal layer partially overlaps the black matrix layer when the first and second substrates are bonded together, the TFT devices formed on the first substrate include (i) first TFT devices formed in a region of display pixels and (ii) second TFT devices formed in a frame region that is outside of the region of display pixels, and the black matrix layer is formed such that a part of the black matrix layer overlaps the second TFT devices in the frame region.

* * * * *